(12) United States Patent
Veilleux, Jr. et al.

(10) Patent No.: US 10,815,906 B2
(45) Date of Patent: Oct. 27, 2020

(54) SYSTEMS AND METHODS FOR FUEL-BASED THERMAL MANAGEMENT

(71) Applicant: UNITED TECHNOLOGIES CORPORATION, Farmington, CT (US)

(72) Inventors: Leo J. Veilleux, Jr., Wethersfield, CT (US); Lubomir A. Ribarov, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 241 days.

(21) Appl. No.: 15/918,097

(22) Filed: Mar. 12, 2018

(65) Prior Publication Data
US 2019/0277201 A1 Sep. 12, 2019

(51) Int. Cl.
| F02C 9/28 | (2006.01) |
| F01P 3/00 | (2006.01) |
| F02C 7/14 | (2006.01) |
| B64D 37/32 | (2006.01) |
| F02C 7/232 | (2006.01) |
| F02C 7/224 | (2006.01) |

(52) U.S. Cl.
CPC ............... *F02C 9/28* (2013.01); *B64D 37/32* (2013.01); *F01P 3/00* (2013.01); *F02C 7/14* (2013.01); *F02C 7/224* (2013.01); *F02C 7/232* (2013.01); *F01P 2003/005* (2013.01); *F05D 2220/323* (2013.01); *F05D 2260/20* (2013.01); *F05D 2260/213* (2013.01)

(58) Field of Classification Search
CPC ....... F01P 2003/005; F02C 7/14; F02C 7/185; F02C 7/224
See application file for complete search history.

(56) References Cited

U.S. PATENT DOCUMENTS

| 4,505,124 | A | 3/1985 | Mayer |
| 4,776,536 | A | 10/1988 | Hudson et al. |
| 7,377,112 | B2 | 5/2008 | Spadaccini et al. |
| 9,759,130 | B2 | 9/2017 | Appukuttan et al. |
| 9,789,972 | B2 | 10/2017 | Smith et al. |
| 2014/0033731 | A1 | 2/2014 | Rackwitz |
| 2014/0090395 | A1* | 4/2014 | Appukuttan ............ F02C 7/141 60/776 |
| 2015/0375868 | A1 | 12/2015 | Smith et al. |
| 2016/0332743 | A1* | 11/2016 | Teicholz ................... F02C 7/14 |

OTHER PUBLICATIONS

European Patent Office, European Search Report dated Jul. 16, 2019 in Application No. 19161301.7.

* cited by examiner

*Primary Examiner* — Scott J Walthour
(74) *Attorney, Agent, or Firm* — Snell & Wilmer L.L.P.

(57) ABSTRACT

A fuel-based thermal management system may comprise a heat exchanger configured to thermally couple a fluid and a fuel. A controller may be configured to modulate a flow of the fluid to the heat exchanger. A tangible, non-transitory memory may be configured to communicate with the controller. The controller may determine a temperature of the fluid, estimate a dissolved oxygen concentration in the fuel using a first fuel temperature, a flight cycle time, and at least one of an altitude measurement or a ambient pressure measurement, and modulate the flow of the fluid to the heat exchanger based on the dissolved oxygen concentration.

20 Claims, 7 Drawing Sheets

SYSTEMS AND METHODS FOR FUEL-BASED THERMAL MANAGEMENT

FIELD

The present disclosure relates generally to thermal management systems, and more specifically, to systems and methods for fuel-based thermal management of a gas turbine engine.

BACKGROUND

A thermal management system in a gas turbine engine may maintain operable temperatures for fuel, oil, and other fluid communicated through the engine. Thermal management systems may employ fuel on board an aircraft as a heat sink to increase operational efficiency of the aircraft. As thermal loads increase due to enhanced electrical architecture in aircraft, a higher thermal load is imposed on the fuel. Conventional methods for accommodating increased thermal loads tend to achieve greater heat transfer by increasing the number heat exchangers or the size of heat exchangers within the system. Increasing the number or size of the heat exchangers can impose additional weight, space, and/or complexity to the airframe.

SUMMARY

In various embodiments, the present disclosure provides a fuel-based thermal management system for a gas turbine engine. The fuel-based thermal management system may comprise a fuel-fluid heat exchange system comprising a heat exchanger configured to thermally couple a fluid received from a heat source and a fuel received from a fuel source, and a valve configured to regulate a flow of the fluid to the heat exchanger. The fuel-based thermal management system may further comprise a controller in operable communication with the valve, and a tangible, non-transitory memory configured to communicate with the controller. The tangible, non-transitory memory may have instructions stored thereon that, in response to execution by the controller, cause the controller to perform operations comprising determining whether a temperature of the fluid is above a predetermine fluid temperature threshold, estimating a dissolved oxygen concentration in the fuel using a first fuel temperature, a flight cycle time, and at least one of an altitude measurement or a ambient pressure measurement, and modulating the flow of the fluid to the heat exchanger based on the dissolved oxygen concentration.

In various embodiments, modulating the flow of the fluid to the heat exchanger based on the dissolved oxygen concentration in the fuel may comprise determining a fuel coking temperature based on the dissolved oxygen concentration, comparing the fuel coking temperature to the first fuel temperature, and determining whether a thermal load from the fluid can be deposited into the fuel based on the comparing of the fuel coking temperature to the first fuel temperature.

In various embodiments, modulating the flow of the fluid to the heat exchanger based on the dissolved oxygen concentration in the fuel may further comprise depositing the thermal load from the fluid into the fuel, receiving a second fuel temperature, comparing the fuel coking temperature to the second fuel temperature, and determining whether to actuate the valve based on the comparing of the fuel coking temperature to the second fuel temperature.

In various embodiments, depositing the thermal load from the fluid into the fuel may comprise actuating the valve to an open position.

In various embodiments, modulating the flow of the fluid to the heat exchanger based on the dissolved oxygen concentration in the fuel may further comprise actuating the valve to a closed position if the second fuel temperature is greater than the fuel coking temperature.

In various embodiments, an output from the heat exchanger may be fluidly coupled to a component of the gas turbine engine. In various embodiments, the fluid may comprise oil or air.

In various embodiments, estimating the dissolved oxygen concentration in the fuel may further comprise receiving dissolved oxygen concentration data output from an oxygen sensor in communication with the fuel.

Also disclosed herein, according to various embodiments, is a method of fuel-based thermal management for a gas turbine engine. The method may comprise modulating, by a controller, a flow of a fluid to a heat exchanger configured to thermally couple the fluid to a fuel, by: receiving a fluid temperature, receiving a first fuel temperature, receiving a flight cycle time, receiving at least one of an altitude measurement or an ambient pressure measurement, estimating a dissolved oxygen concentration of the fuel using the first fuel temperature, the flight cycle time, and the at least one of the altitude measurement or the ambient pressure measurement, and determining whether a thermal load from the fluid can be deposited into the fuel based on the estimating the dissolved oxygen concentration of the fuel.

In various embodiments, determining whether the thermal load from the fluid can be deposited into the fuel may comprise determining a fuel coking temperature based on the dissolved oxygen concentration, and comparing the fuel coking temperature to the first fuel temperature.

In various embodiments, modulating the flow of the fluid to the heat exchanger may further comprise depositing the thermal load from the fluid into the fuel, receiving a second fuel temperature, comparing the fuel coking temperature to the second fuel temperature, and determining whether to adjust a flow rate of the fluid to the heat exchanger based on the comparing of the fuel coking temperature to the second fuel temperature.

In various embodiments, depositing the thermal load from the fluid into the fuel may comprise actuating a valve fluidly coupled between a source of the fluid and the heat exchanger.

In various embodiments, modulating the flow of the fluid to the heat exchanger may further comprise decreasing the flow rate of the fluid if the second fuel temperature is greater than the fuel coking temperature. In various embodiments, decreasing the flow rate of the fluid may comprise actuating a valve fluidly coupled between a source of the fluid and the heat exchanger.

In various embodiments, the fluid may comprise at least one of oil, air, lubricating fluid, fuel, or hydraulic fluid. In various embodiments, the fluid may be output from a component of the gas turbine engine.

Also disclosed herein, according to various embodiments, is a fuel-based thermal management system comprising a heat exchanger configured to thermally couple a fluid and a fuel, a controller configured to modulate a flow of the fluid to the heat exchanger, and a tangible, non-transitory memory configured to communicate with the controller. The tangible, non-transitory memory may have instructions stored thereon that, in response to execution by the controller, cause the controller to perform operations comprising: determining a temperature of the fluid, estimating a dissolved oxygen concentration in the fuel using a first fuel temperature, a flight cycle time, and at least one of an altitude measurement or a ambient pressure measurement, and modulating the flow of the fluid to the heat exchanger based on the dissolved oxygen concentration.

In various embodiments, modulating the flow of the fluid to the heat exchanger may comprise determining a fuel coking temperature based on the dissolved oxygen concentration, comparing the fuel coking temperature to the first fuel temperature, and determining whether a thermal load from the fluid can be deposited into the fuel based on the comparing of the fuel coking temperature to the first fuel temperature.

In various embodiments, modulating the flow of the fluid to the heat exchanger may further comprise receiving a second fuel temperature, comparing the fuel coking temperature to the second fuel temperature, and determining whether to adjust a flow rate of the fluid to the heat exchanger based on the comparing of the fuel coking temperature to the second fuel temperature.

In various embodiments, modulating the flow of the fluid to the heat exchanger may comprise actuating a valve fluidly coupled between a source of the fluid and the heat exchanger.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures.

Figure 1:
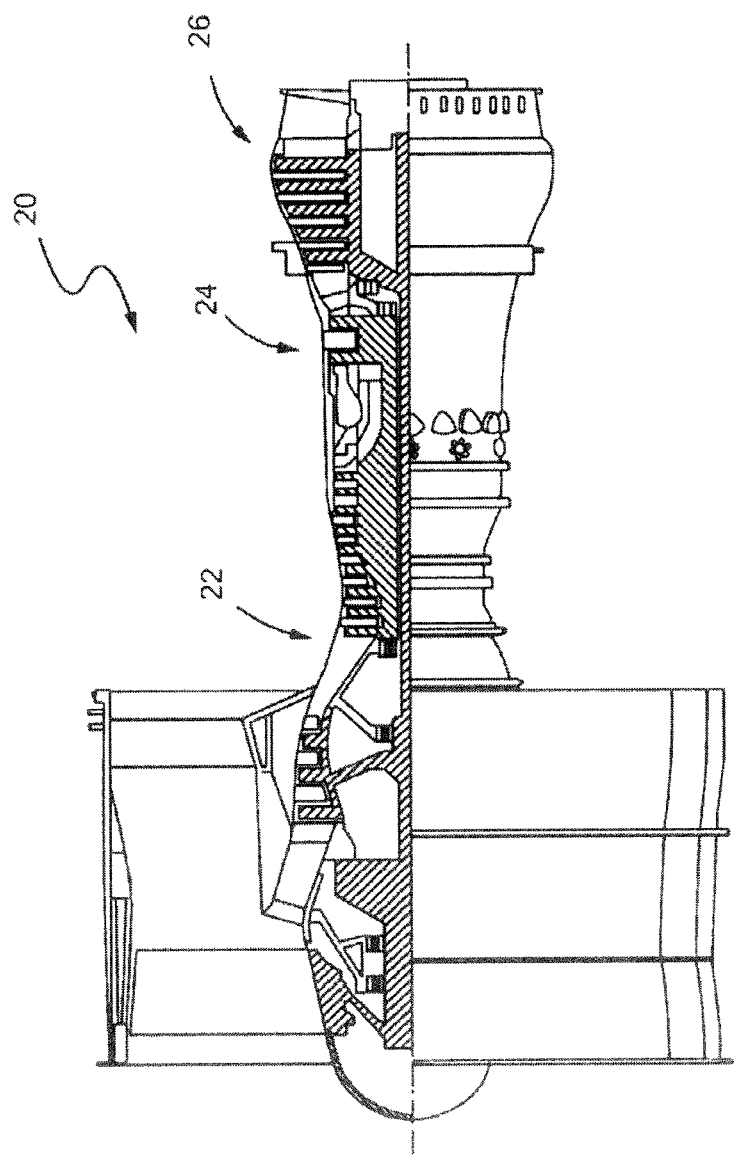
FIG. 1 illustrates a gas turbine engine, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Disclosed herein is a fuel-based thermal management system which utilizes fuel temperature, flight cycle time, and altitude and/or ambient pressure to determine a threshold fuel temperature for a gas turbine engine and to determine whether a thermal energy load may be deposited into the fuel. The fuel-based thermal management system may increase and/or maximize thermal energy deposited into fuel, while maintaining the fuel below a temperature associated with fuel coking, fuel lacquering, or other deposit formation due to thermal degradation to increase or optimize overall thermodynamic cycle efficiency.

Referring to FIG. 1, an exemplary gas turbine engine 20 is shown, in accordance with various embodiments. Gas turbine engine 20 may generally comprise a compressor section 22 where air is pressurized, a combustor 24 downstream of the compressor section 22 which mixes and ignites the compressed air with fuel and thereby generates hot combustion gases, a turbine section 26 downstream of the combustor 24 for extracting power from the hot combustion gases. During operation, compressor section 22, combustor 24, and turbine section 26 generate heat, which may be carried by fluids communicated throughout gas turbine engine 20. For example, fuel, oil, air, lubricating fluids, hydraulic fluids, and the like may be circulated throughout gas turbine engine 20 and may carry a portion of the heat generated during operation. It may be desirable to cool (i.e., remove thermal energy from) these fluids to provide cooling and/or increase thermal efficiency of one or more components of gas turbine engine 20. In various embodiments, and as described in further detail below, fuel injected into combustor 24 may be employed as a heat sink to remove (i.e., absorb) thermal loads from one or more fluid(s) communicated through gas turbine engine 20.

Thermal degradation or breakdown (i.e., lacquering, coking, etc.) of fuel can damage fuel system components (e.g., pumps, valves, filters, etc.). Thermal degradation of fuel can be accelerated by an increased concentration of dissolved oxygen ($O_2$) in the fuel. FIG. 4B illustrates a graph 410 comparing fuel-dissolved $O_2$ concentration with fuel coking threshold temperature. Line 412 illustrates that as fuel-dissolved $O_2$ concentration decreases the fuel coking threshold temperature (i.e., the temperature at which the fuel degradation occurs) increase.

Figure 4A:
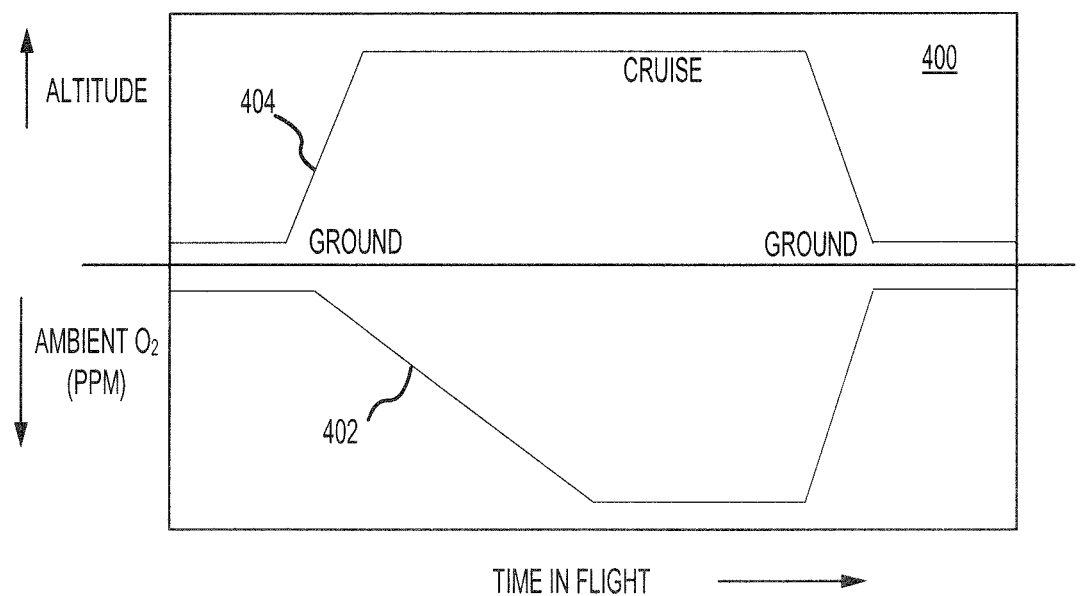
FIG. 4A illustrates a graphical representation of ambient air oxygen ($O_2$) concentration and altitude over a flight profile, in accordance with various embodiments.
Figure 4B:
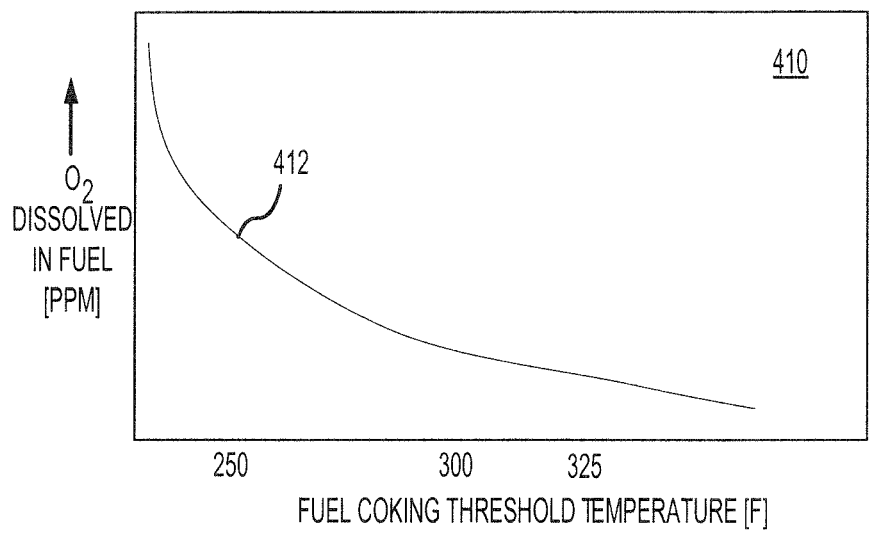
FIG. 4B illustrates a graphical representation of fuel-dissolved $O_2$ concentration as a function of fuel coking threshold temperature, in accordance with various embodiments.

With reference to FIG. 4A, an exemplary graphical representation 400 of ambient air $O_2$ concentration over a flight profile and altitude over the flight profile is illustrated, according to various embodiments. In graph 400, line 402 illustrates ambient air $O_2$ concentration the flight profile and line 404 illustrates altitude of the aircraft over the flight profile. As an aircraft climbs to higher altitudes, the temperature, ambient pressure, and partial pressure of $O_2$ in the ambient air are reduced. In various embodiments, the fuel injected into gas turbine engine 20 may be stored in a fuel tank that is vented (i.e., opened) such that fuel within the tank is exposed to ambient air. The fuel being exposed to ambient air may allow the ambient air conditions to affect the conditions of fuel in fuel tank. For example, the decreased partial pressure of $O_2$ at higher altitudes may result in less ambient $O_2$ being available to be dissolved into the fuel.

Figure 4C:
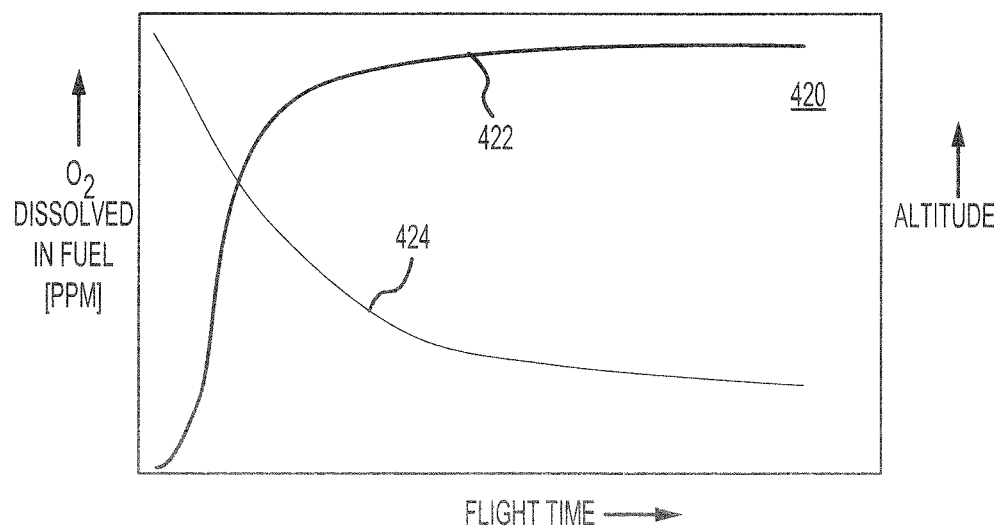
FIG. 4C illustrates a graphical representation of fuel dissolved $O_2$ concentration as a function of flight altitude, in accordance with various embodiments.

Additionally, as altitude increases and partial pressure of ambient $O_2$ decreases, natural degassing may increase such that a rate of $O_2$ evolution out the fuel increases. In other words, more $O_2$ may be evolved out the liquid fuel and into the ullage space of the fuel tank. Further reduction of ambient air pressure at high-altitude cruise heights (e.g., 30,000 feet (9,144 meters) or higher) allows for additional increases in the concentration of $O_2$ in the ullage due to the reduced partial pressure of $O_2$ across the surface of the fuel in the fuel tanks. FIG. 4C illustrates a graph 420 comparing fuel-dissolved $O_2$ concentration 424 and aircraft altitude 422, as a function of flight time. Line 424 illustrates that as flight time (and aircraft altitude 422) increases the fuel-dissolved $O_2$ concentration decreases.

The combined effects of lower ambient air pressure (and, hence lower $O_2$ partial pressure) and the increased degassing of $O_2$ from the liquid fuel may result in a lower $O_2$ content in the liquid fuel. The reduced $O_2$ concentration within the fuel may allow the fuel to absorb more heat before it can reach its thermal degradation limits. Thus, it may be desirable to establish a system and method for determining the amount of oxygen dissolved in the fuel. The amount of oxygen dissolved in the fuel may then be used to determine the amount of thermal energy that can be added to the fuel.

Figure 2A:
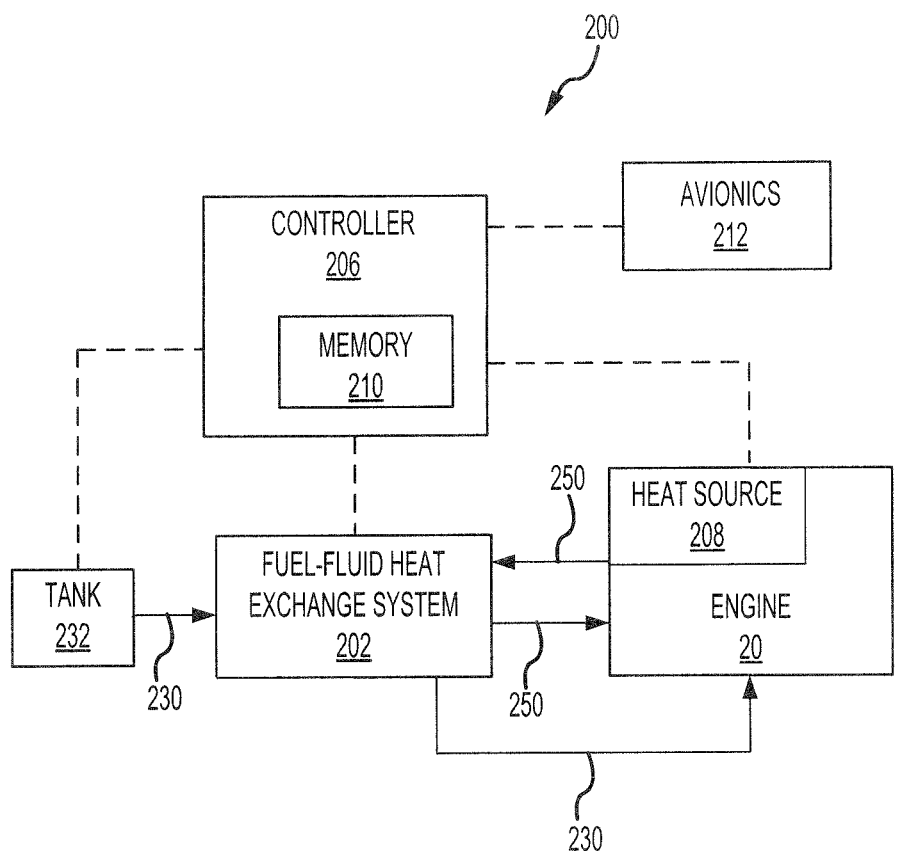
FIGS. 2A and 2B illustrate a block diagram of a fuel-based thermal management system for a gas turbine engine, in accordance with various embodiments.

With reference to FIG. 2A, a schematic block diagram of a fuel-based thermal management system 200 is illustrated, in accordance with various embodiments. Fuel-based thermal management system 200 may comprise fuel-fluid heat exchange system 202. Fuel-fluid heat exchange system 202 receives a fluid 250 output from a heat source 208. In various embodiments, heat source 208 may comprise one or more components of gas turbine engine 20. Fluid 250 may comprise oil, air, lubricating fluid, fuel, hydraulic fluid, or any other aircraft or engine fluid. Fuel-fluid heat exchange system 202 further receives fuel 230 output from a fuel tank 232. Fuel-fluid heat exchange system 202 may be configured to exchange thermal energy (i.e., heat) between fluid 250 and fuel 230. In various embodiments, thermal energy is transferred from fluid 250 to fuel 230 within fuel-fluid heat exchange system 202, such that a temperature of the fluid 250 input into fuel-fluid heat exchange system 202 is greater than the temperature of the fluid 250 output from fuel-fluid heat exchange system 202, and a temperature of the fuel 230 input into fuel-fluid heat exchange system 202 is less than the temperature of the fuel 230 output from fuel-fluid heat exchange system 202. Cooled fluid 250 (i.e., the fluid output from fuel-fluid heat exchange system 202) may be directed back to gas turbine engine 20. In various embodiments, cooled fluid 250 may be used to cool one or more components of gas turbine engine 20. In various embodiments, cooled fluid 250 may directed to, and may cool, an aircraft component other than gas turbine engine 20.

Fuel-fluid heat exchange system 202 may be in communication with a controller 206. In various embodiments, controller 206 may comprise a full authority digital engine control (FADEC) system. Controller 206 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

Controller 206 may include a memory 210. Memory 210 may store executable instructions and data to implement control logic of controller 206. Memory 210 may comprise a tangible, non-transitory storage medium and may store data used, for example, for trending and prognosis purposes.

Controller 206 may be in logical and/or electronic communication with one or more components of fuel-based thermal management system 200. In various embodiments, controller 206 may receive data output from fuel-fluid heat exchange system 202, gas turbine engine 20, heat source 208, fuel tank 232, and/or an avionics unit 212. Controller 206 may receive data correlating to various engine or aircraft operating conditions, such as, for example, altitude, ambient air temperature, ambient air pressure, dissolved $O_2$ fuel concentration, time in flight cycle, temperature of fuel being input into heat exchanger, temperature of fuel being output from heat exchanger, temperature of the fuel in the fuel tank, speed of the aircraft, Mach number, rotational speed of one or more components of gas turbine engine 20, or any other operating information.

Controller 206 may interpret data received from fuel-fluid heat exchange system 202, gas turbine engine 20, heat source 208, fuel tank 232, and/or an avionics unit 212 to determine a real-time dissolved $O_2$ concentration within fuel 230 and the threshold fuel coking temperature associated with the dissolved $O_2$ concentration.

Figure 2B:
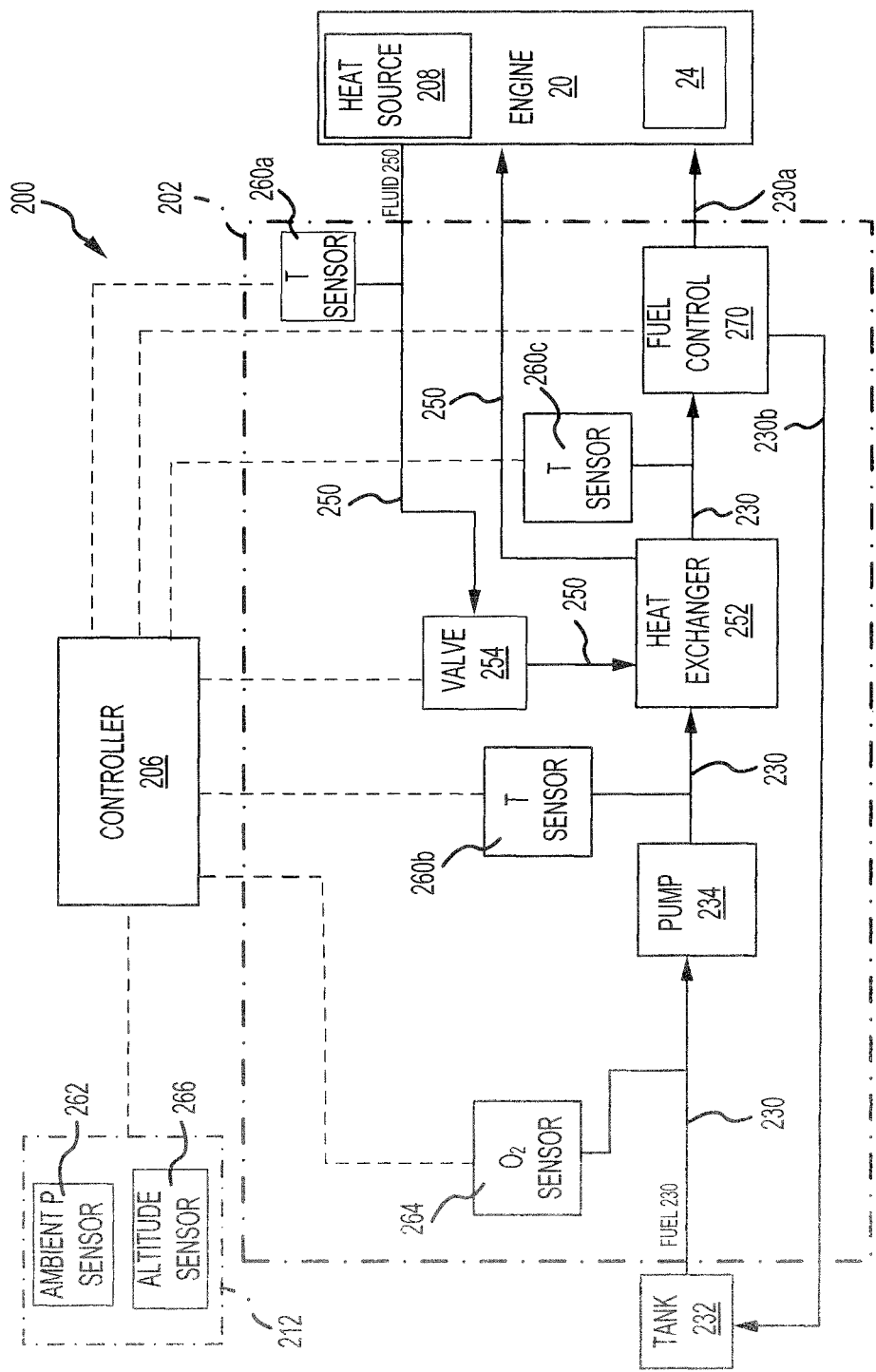

With reference to FIG. 2B, additional details of fuel-fluid heat exchange system 202 are illustrated according to various embodiments. Fuel-fluid heat exchange system 202 may include a heat exchanger 252. Heat exchanger 252 is configured to thermally couple the fluid 250 output from heat source 208 and the fuel 230 output from fuel tank 232.

A valve 254 (e.g., a flow control valve) may be located upstream of heat exchanger 252. Valve 254 may be located between, and fluidly coupled to, heat source 208 and heat exchanger 252 such that fluid 250 flows from an output of heat source 208 to an input of valve 254, and from an output of valve 254 to an input of heat exchanger 252. Valve 254 may be configured to regulate a flow rate of fluid 250 to heat exchanger 252. Controller 206 may be in operable communication with valve 254. Controller may cause an actuation of valve 254 to modulate and/or adjust a flow rate of fluid 250 to heat exchanger 252.

A fuel pump 234, located between heat source 208 and fuel tank 232, may control the flow of fuel 230. Fuel 230 output from heat exchanger 252 may flow to a fuel control valve 270. Fuel control valve 270 may be configured to regulate the flow of fuel 230 to gas turbine engine 20, for example, to combustor 24. In various embodiments, fuel control valve 270 may be configured to direct a first portion 230a of the fuel 230 output from heat exchanger 252 to flow to gas turbine engine 20 and to direct a second portion 230b of the fuel back into fuel tank 232.

In various embodiments, the $O_2$-rich ullage of fuel tank 232 may be inerted by the a fuel tank inerting system at a determined rate such that fuel tank 232 remains inert during flight. During the inerting operation, the $O_2$ is evolved out fuel 230 and accepted by the $N_2$-rich environment due to the inerting process. Additional fuel agitation due to operation of fuel pump 234 may further enhance the degassing of $O_2$ out of fuel 230 within fuel tank 232.

Controller 206 may receive data output one or more sensor(s) within fuel-fluid heat exchange system 202, gas turbine engine 20, heat source 208, fuel tank 232, and/or avionics unit 212. Controller 206 may receive and interpret temperature data from a fluid temperature sensor 260a. The data output from fluid temperature sensor 260a may correspond to the temperature of fluid 250 output from heat source 208. Controller 206 may receive and interpret temperature data from a fuel temperature sensor 260b upstream of heat exchanger 252. The data output from fuel temperature sensor 260b may correspond to the temperature of fuel 230 upstream of heat exchanger 252. Stated differently, the data output from fuel temperature sensor 260b may correspond to the temperature of fuel 230 output from fuel tank 232 and/or from fuel pump 234.

Controller 206 may receive and interpret temperature data from a fuel temperature sensor 260c downstream of heat exchanger 252. The data output from fuel temperature sensor 260c may correspond to the temperature of fuel 230 downstream of, and/or output from, heat exchanger 252. Controller 206 may receive and interpret altitude data from an altitude sensor 266. In various embodiments, altitude sensor 266 may be included in avionics unit 212. Controller 206 may receive and interpret ambient pressure data from a pressure sensor 262. In various embodiments, pressure sensor 262 may be may be included in avionics unit 212. Controller 206 may also receive and interpret flight cycle time (e.g., minutes since take-off) from avionics unit 212.

Controller 206 may receive and interpret dissolved $O_2$ concentration data from an $O_2$ sensor 264 in communication (e.g., fluid communication) with fuel 230. In various embodiments, $O_2$ sensor 264 may be located between fuel tank 232 and fuel pump 234. In various embodiments, $O_2$ sensor 264 may be located in fuel tank 232. Controller 206 may receive data from $O_2$ sensor 264 corresponding to the pre-flight concentration of dissolved $O_2$ in fuel 230 (e.g., measured when fuel 230 is loaded into fuel tank 232). Controller 206 may also receive in-flight dissolved $O_2$ concentration data from $O_2$ sensor 264 (e.g., continuously during flight).

As described in further detail below, controller 206 may use some or all the sensor and/or avionics data to determine a real-time dissolved $O_2$ concentration within fuel 230, the threshold fuel coking temperature associated with the dissolved $O_2$ concentration, and/or the amount of thermal load fuel 230 can absorb without exceeding a threshold fuel coking temperature.

Figure 3A:
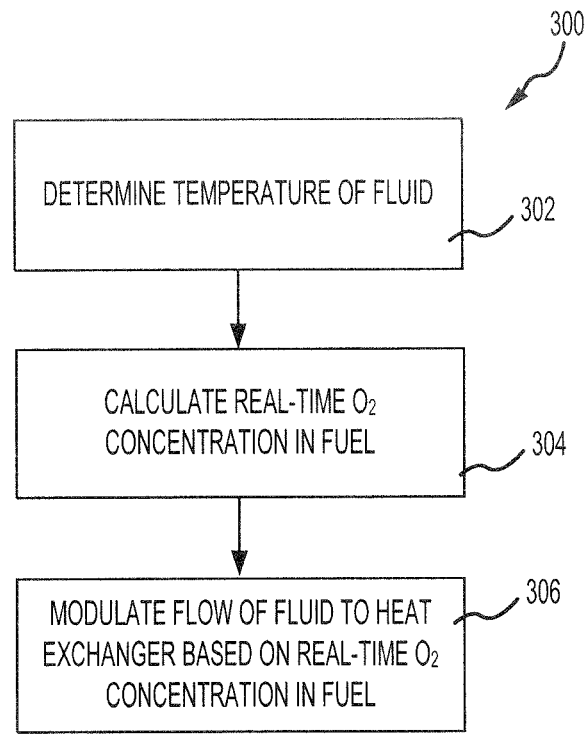
FIGS. 3A, 3B, and 3C illustrate a flow chart for a method of thermal management for a gas turbine engine, in accordance with various embodiments.

With reference to FIG. 3A, a method 300 of fuel-based thermal management of a gas turbine engine is illustrated, in accordance with various embodiments. Method 300 may comprise determining a temperature of a fluid output from a heat source (step 302), estimating a real-time dissolved $O_2$ concentration within the fuel (step 304), and modulating a flow of the fluid to a heat exchanger based on the real-time dissolved $O_2$ concentration (step 306).

Figure 3C:
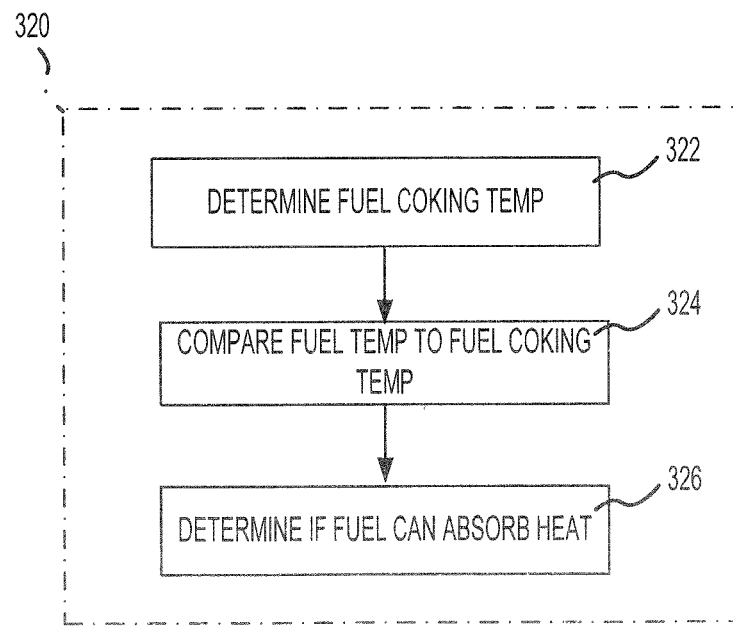
Figure 3B:
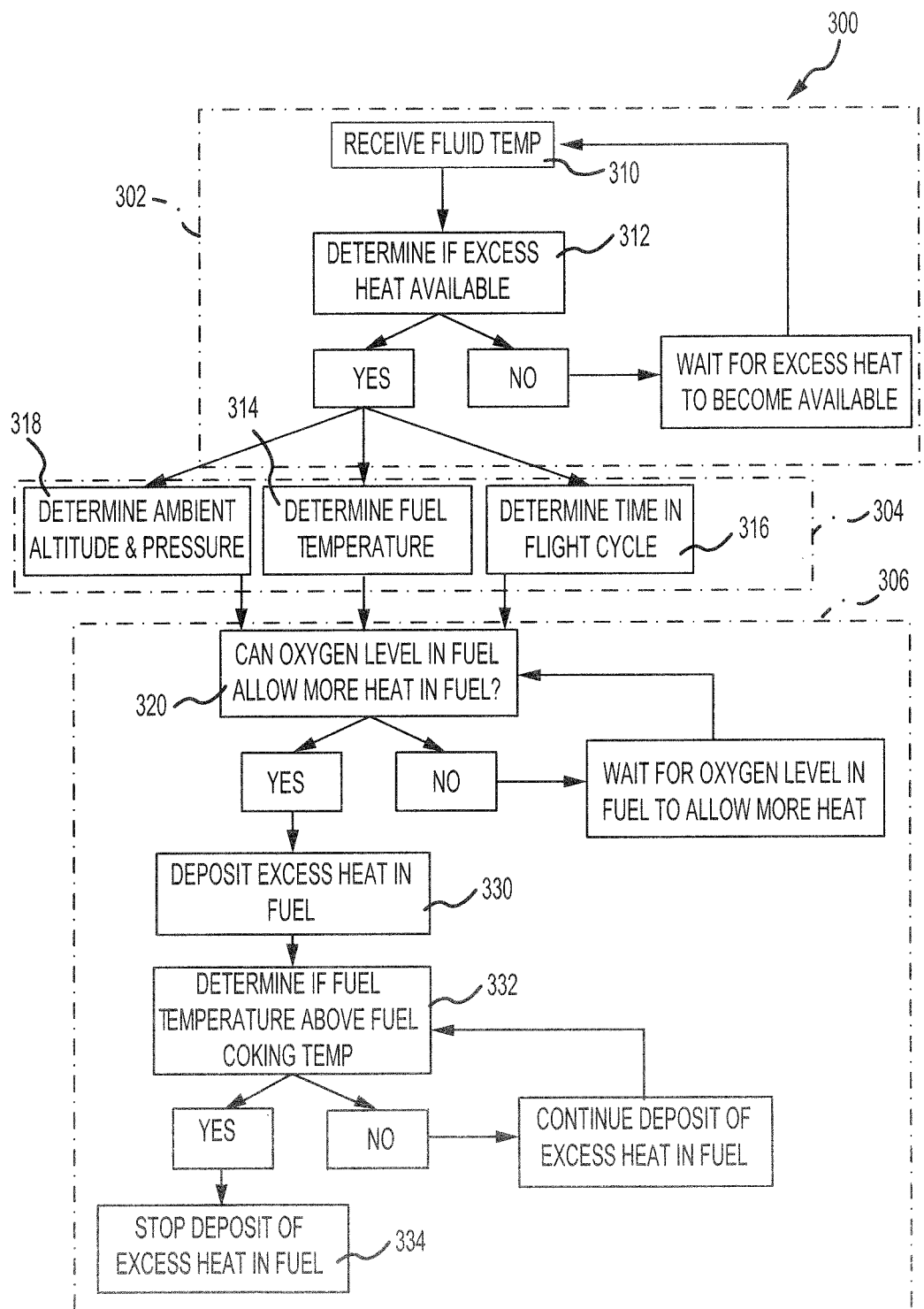

With combined reference to FIG. 2B and FIG. 3B, in various embodiments, step 302 may comprise controller 206 receiving a fluid 250 temperature measurement from, for example, fluid temperature sensor 260a (step 310) and determining whether excess heat is available for deposition into fuel 230 (step 312). Stated differently, controller 206 may determine whether the temperature of fluid 250 is greater than a predetermined temperature threshold. In various embodiments, the predetermined temperature threshold may vary based on flight cycle time. For example, the predetermined temperature threshold may decrease as time since take-off increases. Stated differently, controller 206 may compare the temperature of fluid 250 to a first predetermined temperature threshold during a flight cycle time of, for example, 0 minutes after take-off to 15 minutes after take-off, and may compare the temperature of fluid 250 to a second predetermined temperature threshold during a flight cycle time of, for example, 15 minutes after take-off to 15 minutes before landing. If controller 206 determines the temperature of fluid 250 is not greater than the predetermined temperature threshold, controller 206 returns to step 310. If controller 206 determines the temperature of fluid 250 is greater than or equal to the predetermined temperature threshold, controller estimates the dissolved $O_2$ concentration of fuel 230 (step 304).

In various embodiments, step 304 may comprise controller 206 receiving a first fuel temperature from, for example, fuel temperature sensor 260b (step 314), a flight cycle time (e.g., minutes since take-off data) from avionics unit 212 (step 316), and at least one of an altitude measurement from, for example, altitude sensor 266 or an ambient pressure measurement from, for example, pressure sensor 262 (step 318). Controller 206 may estimate the dissolved $O_2$ concentration using the first fuel temperature, flight cycle time, and altitude and/or pressure measurement(s). In various embodiments, step 304 may further include receiving a dissolved $O_2$ concentration measurement from, for example, $O_2$ sensor 264 and using the first fuel temperature, flight cycle time, and altitude and/or pressure measurement(s) to update or correct the dissolved $O_2$ concentration measurement received from $O_2$ sensor 264.

A temperature of fuel tank 232 can also affect the degassing of $O_2$ from fuel 230. For example, $O_2$ will degas from fuel 230 at a faster rate in a hotter fuel environment. In this regard, the $O_2$ dissolved in the fuel in a fuel tank of an aircraft taking off at first temperature will degas faster than $O_2$ in a comparable amount of fuel in a comparable fuel tank of an aircraft taking off at second temperature that is less than first temperature. In this regard, controller 206 may receive data related to the ambient air temperature and/or the fuel tank 232 temperature at take-off, and may use these data (along with flight cycle time, ambient pressure, etc.) to estimate the real-time $O_2$ concentration in the fuel. After estimating the real-time $O_2$ concentration, controller may modulate the flow of fluid 250 to heat exchanger 252 based on the real-time $O_2$ concentration (step 306).

In various embodiments, step 306 may comprise controller 206 determining whether fuel 230 can absorb additional heat without exceeding the fuel coking temperature associated with the estimated O$_2$ concentration (step 320). With combined reference to FIG. 2B and FIG. 3C, in various embodiments, step 320 comprises controller 206 determining a fuel coking temperature based on the dissolved O$_2$ concentration of fuel 230 (step 322), controller 206 comparing the fuel coking temperature to the temperature of fuel 230 (e.g., to the first fuel temperature output from fuel temperature sensor 260*b*) (step 324), and controller 206 determining whether a thermal load from fluid 250 can be deposited into fuel 230 based on the comparison of the fuel coking temperature to the temperature of fuel 230 (step 326).

With combined reference to FIG. 2B and FIG. 3B, in various embodiments, if controller 206 determines fuel 230 cannot absorb a thermal load from fluid 250 without exceeding the fuel coking temperature, controller 206 returns to step 320 until controller 206 determines fuel 230 can absorb additional heat without exceeding the fuel coking temperature. Stated differently, if controller 206 determines that the temperature of fuel 230 is greater than the fuel coking temperature or is within a predetermined number of degrees from the fuel coking temperature, controller actuates valve 254 to prevent or reduce a flow of fluid 250 to heat exchanger 252. If controller 206 determines fuel 230 can absorb heat from fluid 250, controller 206 causes heat from fluid 250 to be deposited in fuel 230 (step 330). In various embodiments, step 330 may comprise controller 206 actuating valve 254. For example, controller 206 may send a signal that causes valve 254 to actuate to an open position.

In various embodiments, step 306 may further include controller 206 receiving a second fuel temperature from, for example, fuel temperature sensor 260*c*, and comparing the fuel coking temperature to the second fuel temperature (step 332). Controller 206 may determine whether to actuate valve 254 based on the comparison of the fuel coking temperature to the second fuel temperature. If controller 206 determines that the second fuel temperature is greater than the fuel coking temperature, controller 206 may actuate valve 254 to a closed position that prevents or reduces the flow of fluid 250 to heat exchanger 252. (step 334).

Fuel-based thermal management system 200 and method 300 may provide increased dissolved O$_2$ concentration accuracy by being fully integrated with the aircraft on-board computers for receiving real-time flight data. Increasing the dissolved O$_2$ concentration accuracy may extend the fuel's heat sink capabilities without adding additional heat exchangers or other hardware and/or without increasing the size of the heat exchanger(s). Increasing the accuracy of the real-time detection of dissolved O$_2$ concentration reduces potential unwanted occurrences of damage to fuel system components by reducing their exposure to fuel that is above the fuel's coking temperature for extended periods of time.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of fuel-based thermal management for a gas turbine engine, comprising:
   receiving, by a controller, a fluid temperature of a flow of a fluid from a fluid temperature sensor upstream of a heat exchanger, the heat exchanger configured to thermally couple the fluid to a fuel;
   receiving, by the controller, a first fuel temperature from a first fuel temperature sensor upstream of the heat exchanger;
   receiving, by the controller, a flight cycle time;
   receiving, by the controller, at least one of an altitude measurement or an ambient pressure measurement;
   receiving, by the controller, a dissolved oxygen concentration measurement from an oxygen sensor configured to measure a dissolved oxygen concentration of the fuel;
   determining, by the controller, an updated dissolved oxygen concentration using the dissolved oxygen concentration measurement received from the oxygen sensor, the first fuel temperature, the flight cycle time, and the at least one of the altitude measurement or the ambient pressure measurement;

determining, by the controller, whether a thermal load from the fluid can be deposited into the fuel based on the determining the updated dissolved oxygen concentration of the fuel; and modulating, by the controller, the flow of the fluid to the heat exchanger based on the determining, by the controller, whether the thermal load from the fluid can be deposited into the fuel.

2. The method of claim 1, wherein the determining, by the controller, whether the thermal load from the fluid can be deposited into the fuel comprises:

determining, by the controller, a fuel coking temperature based on the updated dissolved oxygen concentration; and comparing, by the controller, the fuel coking temperature to the first fuel temperature.

3. The method of claim 2, wherein the modulating, by the controller, the flow of the fluid to the heat exchanger further comprises:

depositing, using the heat exchanger, the thermal load from the fluid into the fuel;

receiving, by the controller, a second fuel temperature from a second fuel temperature sensor downstream of the heat exchanger;

comparing, by the controller, the fuel coking temperature to the second fuel temperature; and determining, by the controller, whether to adjust a flow rate of the fluid to the heat exchanger based on the comparing of the fuel coking temperature to the second fuel temperature.

4. The method of claim 3, wherein the depositing, using the heat exchanger, the thermal load from the fluid into the fuel comprises:

actuating, by the controller, a valve fluidly coupled between a source of the fluid and the heat exchanger.

5. The method of claim 3, wherein the modulating, by the controller, the flow of the fluid to the heat exchanger further comprises:

decreasing, by the controller, the flow rate of the fluid if the second fuel temperature is greater than the fuel coking temperature.

6. The method of claim 5, wherein the decreasing, by the controller, the flow rate of the fluid comprises:

actuating, by the controller, a valve fluidly coupled between a source of the fluid and the heat exchanger.

7. The method of claim 1, wherein the fluid comprises at least one of oil, air, lubricating fluid, fuel, or hydraulic fluid.

8. The method of claim 7, wherein the fluid is output from a component of the gas turbine engine.

9. A fuel-based thermal management system, comprising:

a heat exchanger configured to thermally couple a fluid and a fuel;

a controller configured to modulate a flow of the fluid to the heat exchanger; and a tangible, non-transitory memory configured to communicate with the controller, the tangible, non-transitory memory having instructions stored thereon that, in response to execution by the controller, cause the controller to perform operations comprising:

determining, by the controller, a temperature of the fluid;

receiving, by the controller, a dissolved oxygen concentration measurement from an oxygen sensor configured to measure a dissolved oxygen concentration of the fuel;

receiving, by the controller, a first fuel temperature from a first fuel temperature sensor upstream of the heat exchanger;

determining, by the controller, an updated dissolved oxygen concentration using the dissolved oxygen concentration measurement received from the oxygen sensor, the first fuel temperature, a flight cycle time, and at least one of an altitude measurement or an ambient pressure measurement; and modulating, by the controller, the flow of the fluid to the heat exchanger based on the updated dissolved oxygen concentration of the fuel.

10. The fuel-based thermal management system of claim 9, wherein the operation of modulating, by the controller, the flow of the fluid to the heat exchanger based on the updated dissolved oxygen concentration of the fuel comprises:

determining, by the controller, a fuel coking temperature based on the updated dissolved oxygen concentration of the fuel;

comparing, by the controller, the fuel coking temperature to the first fuel temperature; and determining, by the controller, whether a thermal load from the fluid can be deposited into the fuel based on the comparing of the fuel coking temperature to the first fuel temperature.

11. The fuel-based thermal management system of claim 10, wherein the operation of modulating, by the controller, the flow of the fluid to the heat exchanger based on the updated dissolved oxygen concentration of the fuel further comprises:

receiving, by the controller, a second fuel temperature;

comparing, by the controller, the fuel coking temperature to the second fuel temperature; and determining, by the controller, whether to adjust a flow rate of the fluid to the heat exchanger based on the comparing of the fuel coking temperature to the second fuel temperature.

12. The fuel-based thermal management system of claim 9, wherein the operation of modulating, by the controller, the flow of the fluid to the heat exchanger based on the updated dissolved oxygen concentration of the fuel comprises:

actuating, by the controller, a valve fluidly coupled between a source of the fluid and the heat exchanger.

13. A fuel-based thermal management system for a gas turbine engine, comprising:

a fuel-fluid heat exchange system comprising:

a heat exchanger configured to thermally couple a fluid received from a heat source and a fuel received from a fuel source, and a valve configured to regulate a flow of the fluid to the heat exchanger;

a controller in operable communication with the valve; and a tangible, non-transitory memory configured to communicate with the controller, the tangible, non-transitory memory having instructions stored thereon that, in response to execution by the controller, cause the controller to perform operations comprising:

determining, by the controller, whether a temperature of the fluid is above a predetermined fluid temperature threshold;

receiving, by the controller, a dissolved oxygen concentration measurement from an oxygen sensor configured to measure a dissolved oxygen concentration of the fuel output by the fuel source;

receiving, by the controller, a first fuel temperature from a first fuel temperature sensor upstream of the heat exchanger;

determining, by the controller, an updated dissolved oxygen concentration using the dissolved oxygen concentration measurement received from the oxygen sensor, the first fuel temperature, a flight cycle time, and at least one of an altitude measurement or an ambient pressure measurement; and modulating, by the controller, the flow of the fluid to the heat exchanger based on the updated dissolved oxygen concentration.

14. The fuel-based thermal management system of claim 13, wherein modulating, by the controller, the flow of the fluid to the heat exchanger based on the updated dissolved oxygen concentration in the fuel comprises:

determining, by the controller, a fuel coking temperature based on the updated dissolved oxygen concentration;

comparing, by the controller, the fuel coking temperature to the first fuel temperature; and determining, by the controller, whether a thermal load from the fluid can be deposited into the fuel based on the comparing of the fuel coking temperature to the first fuel temperature.

15. The fuel-based thermal management system of claim 14, wherein modulating, by the controller, the flow of the fluid to the heat exchanger based on the updated dissolved oxygen concentration in the fuel further comprises:

depositing, using the heat exchanger, the thermal load from the fluid into the fuel;

receiving, by the controller, a second fuel temperature from a second temperature sensor downstream of the heat exchanger;

comparing, by the controller, the fuel coking temperature to the second fuel temperature; and determining, by the controller, whether to actuate the valve based on the comparing of the fuel coking temperature to the second fuel temperature.

16. The fuel-based thermal management system of claim 15, wherein depositing, using the heat exchanger, the thermal load from the fluid into the fuel comprises:

actuating, by the controller, the valve to an open position.

17. The fuel-based thermal management system of claim 16, wherein modulating, by the controller, the flow of the fluid to the heat exchanger based on the updated dissolved oxygen concentration in the fuel further comprises:

actuating, by the controller, the valve to a closed position if the second fuel temperature is greater than the fuel coking temperature.

18. The fuel-based thermal management system of claim 13, wherein an output flow of the fluid from the heat exchanger is directed to a component of the gas turbine engine.

19. The fuel-based thermal management system of claim 18, wherein the fluid comprises at least one of oil or air.

20. The fuel-based thermal management system of claim 13, wherein the dissolved oxygen concentration measurement output from the oxygen sensor corresponds to a pre-flight concentration of dissolved oxygen.

* * * * *